(12) United States Patent
Kito et al.

(10) Patent No.: US 7,480,812 B2
(45) Date of Patent: Jan. 20, 2009

(54) MICROPROCESSOR

(75) Inventors: Ryosuke Kito, Kawasaki (JP);
Masayuki Tsuji, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 400 days.

(21) Appl. No.: 11/165,239

(22) Filed: Jun. 24, 2005

(65) Prior Publication Data

US 2006/0200692 A1 Sep. 7, 2006

(30) Foreign Application Priority Data

Mar. 7, 2005 (JP) ............................. 2005-062615

(51) Int. Cl.
*G06F 1/32* (2006.01)
(52) U.S. Cl. ...................... 713/320; 713/300; 713/323; 713/324
(58) Field of Classification Search ......... 713/300–601; 712/1–43, 220–248
See application file for complete search history.

(56) References Cited

U.S. PATENT DOCUMENTS 6,317,840 B1 * 11/2001 Dean et al. .................. 713/320
6,832,117 B1 * 12/2004 Miyamori ....................... 700/2
6,915,414 B2 * 7/2005 Yearsley et al. .............. 712/219
7,100,060 B2 * 8/2006 Cai et al. ..................... 713/320
7,249,268 B2 * 7/2007 Bhandarkar ................. 713/320
2003/0093655 A1 * 5/2003 Gosior et al. ............... 712/228
2006/0020831 A1 * 1/2006 Golla et al. ................. 713/300

FOREIGN PATENT DOCUMENTS

JP        60-553        1/1985

* cited by examiner

*Primary Examiner*—Tse Chen
(74) *Attorney, Agent, or Firm*—Staas & Halsey LLP (57) ABSTRACT

A processor core adopts a pipeline processing method and has an interlock mechanism. A built-in accelerator executes a specific processing in place of the processor core. When a processing is executed by the built-in accelerator and there is no processing to be executed by the processor core, the interlock mechanism stops and restarts the pipeline processing in response to a start of processing and a processing completion of the built-in accelerator, respectively. A processing-completion waiting operation to the built-in accelerator is implemented by using the interlock mechanism, and thus useless power consumption of the processor core during the processing of the built-in accelerator can be easily reduced.

9 Claims, 4 Drawing Sheets

MICROPROCESSOR

CROSS-REFERENCE TO RELATED APPLICATION

This application is based upon and claims the benefit of priority from Japanese Patent Application No. 2005-062615, filed on Mar. 7, 2005, the entire contents of which are incorporated herein by reference.

BACKGROUND OF THE INVENTION

1. Field of the Invention

The present invention relates to a microprocessor, and more particularly, relates to a pipeline processing-type microprocessor having a hard accelerator (a built-in accelerator).

2. Description of the Related Art

Recently, the performance of an electronic apparatus has been drastically enhanced and a demand for a microprocessor having throughput is increasing so as to be in charge of a control system of the electronic apparatus. On the other hand, in view of a travel time of a small, portable apparatus or an environmental problem, a microprocessor having low power consumption is demanded. In the development of the microprocessor, it is important to realize these contradictory demands in balance.

In order to efficiently use limited throughput of a processor core (CPU), a high-end microprocessor is provided with a built-in hard accelerator (including a co-processor) having functions implemented by hardware, which are generally implemented by software. In such a microprocessor, only a specific processing which can be performed by the hard accelerator can be performed at high speed with hardware by starting the hard accelerator, without operating the processor core. The processor core can execute additional processing during the execution of the processing by the hard accelerator.

Further, in Japanese Unexamined Patent Application Publication No. Sho 60-553, a technique which, in a channel-command-word-type system, can enhance an efficiency of an interrupt processing of a main central processing unit on the interrupt when a channel device generates an interrupt at the time of receiving data is disclosed. Specifically, a receive command completion bit is provided in an interrupt status register of the channel device. The main central processing unit checks the receive command completion bit when a channel command word completion interrupt is generated from the channel device and recognizes the completion of the receive command indicating the data reception of the channel device if the receive command completion bit is set.

When the specific processing is executed by the hard accelerator, the processor core needs to recognize whether or not the processing is completed by the hard accelerator. For this reason, the processor core needs to execute polling regularly for the hard accelerator or needs to wait for the generation of the interrupt indicating the processing completion of the hard accelerator. Thus, during the processing of the hard accelerator, the processor core needs to be operated constantly so as only to recognize the processing completion of the hard accelerator, even when there is no processing to be executed. As a result, useless power consumption occurs.

In order to solve this problem, when a processing-completion waiting operation mechanism to the hard accelerator is constructed, as the easiest unit, a dedicated circuit for executing a processing-completion waiting operation with respect to the hard accelerator is provided. Assuming that such a dedicated circuit is mounted on the microprocessor, examination of a circuit, which judges the processing status of the hard accelerator, is required independently of the processor core. On this circuit, a mechanism for starting the processor core changed over a low power consumption mode after the processing completion of the hard accelerator needs to be mounted. Thus, at the time of the design and development of the microprocessor with such a dedicated circuit mounted thereon, it is necessary to carefully examine a managing method of an interrupt generated during the low power consumption mode of the processor core or whether or not there occurs any problem in operations inherent in the microprocessor due to the mounting of the dedicated circuit. Further, after the design of the microprocessor is completed, new operation verification over multiple items is needed. In addition, with the mounting of the dedicated circuit, the circuit scale of the microprocessor may be increased.

SUMMARY OF THE INVENTION

It is an object of the invention to easily reduce useless power consumption of a processor core during a processing of a hard accelerator.

According to an aspect of the invention, a microprocessor includes a processor core that adopts a pipeline processing method and has an interlock mechanism stopping and restarting a pipeline processing according to processing data so as to ensure justness of a processing result of the pipeline processing, and an assistance circuit that executes a specific processing in place of the processor core. When a processing is executed by the assistance circuit and there is no processing to be executed by the processor core, the interlock mechanism stops and restarts the pipeline processing in response to a start of processing and a processing completion of the assistance circuit, respectively.

In accordance with the aspect of the invention, regarding the microprocessor having the interlock mechanism, only by adding "the start of processing of the assistance circuit" as a cause for stopping of the pipeline processing by the interlock mechanism and by adding "the processing completion of the assistance circuit" as a cause for restarting of the pipeline processing by the interlock mechanism, a processing-completion waiting operation mechanism to the assistance circuit can be implemented. Generally, the pipeline processing-type processor core has the interlock mechanism. Thus, regarding an existing microprocessor, as described above, the processing-completion waiting operation mechanism to the assistance circuit is implemented by using the interlock mechanism, such that useless power consumption during the processing of the assistance circuit can be reduced with a simple circuit configuration. Further, an increase in verification works after the design completion of the microprocessor can be avoided.

It is preferable that the processor core has a normal mode and a low power consumption mode. During the normal mode, when the processing is executed by the assistance circuit and there is no processing to be executed by the processor core, the processor core shifts to the low power consumption mode in response to the stop of the pipeline processing by the interlock mechanism through a completion waiting operation to the assistance circuit. For this reason, the processor core shifts from the normal mode to the low power consumption mode (for example, the mode in which a clock in the processor core is stopped) at a high speed. As a result, useless power consumption can be further reduced.

It is preferable that, during the low power consumption mode, the processor core returns to the normal mode in response to the restart of the pipeline processing by the interlock mechanism through the completion waiting operation to the assistance circuit. For this reason, the processor core can return from the low power consumption mode to the normal mode at a high speed.

It is preferable that, during the stop of the pipeline processing, the interlock mechanism restarts the pipeline processing in response to the occurrence of an interrupt. Accordingly, the processor core returns from the low power consumption mode to the normal mode. Further, it is preferable that the interlock mechanism stops the pipeline processing again after an interrupt processing by the processor core is completed. Accordingly, the processor core shifts to the low power consumption mode again. Thus, even in the low power consumption mode, the processor core can receive the interrupt. Typically, the microprocessor having the interlock mechanism has a function that receives the interrupt occurred during the operation of the interlock mechanism (when the pipeline processing is stopped by the interlock mechanism). For this reason, after the design completion of the microprocessor, an operation verification regarding the interrupt occurred during the low power consumption mode of the processor core does not need to be newly executed.

It is preferable that the processor core has a detection circuit that detects the start of processing and the processing completion of the assistance circuit, respectively. When there is no processing to be executed by the processor core during the processing of the assistance circuit, the interlock mechanism stops and restarts the pipeline processing in response to detection of the start of processing and detection of the processing completion of the assistance circuit by the detection circuit, respectively. By providing the detection circuit, the stop timing and the restart timing of the pipeline processing by the interlock mechanism can be easily defined.

It is preferable that the processor core has a first register which is accessed in accordance with the start of processing of the assistance circuit. The detection circuit detects the start of processing of the assistance circuit by the occurrence of the access to the first register. Accordingly, the detection of the start of processing of the assistance circuit by the detection circuit can be easily realized.

It is preferable that a second register of the processor core is set in response to the processing completion of the assistance circuit. The detection circuit detects the processing completion of the assistance circuit by the setting of the second register. Accordingly, the detection of the processing completion of the assistance circuit by the detection circuit can be easily realized.

It is preferable that a third register of the processor core indicates permission/inhibition of a detection operation of the detection circuit. The detection circuit may execute the detection operation only when the third register indicates the permission. By providing the third register, validity/invalidity of the processing-completion waiting operation to the assistance circuit can be easily set.

It is preferable that a fourth register of the processor core is set during the processing of the assistance circuit. By referring to the fourth register, the execution status of the processing of the assistance circuit can be easily recognized.

It is preferable that the microprocessor has a plurality of assistance circuits. A plurality of detection circuits of the processor core is provided to correspond to the plurality of assistance circuits. Each of the detection circuits detects the start of processing and the processing completion of a corresponding assistance circuit. A first register of the processor core is accessed in accordance with the start of processing of the plurality of assistance circuits. A second register of the processor core has a plurality of bits which corresponds to the plurality of assistance circuits. Each bit of the second register is set in response to the processing completion of a corresponding assistance circuit. A third register of the processor core has a plurality of bits which corresponds to the plurality of detection circuits. Each bit of the third register indicates permission/inhibition of a detection operation of a corresponding detection circuit. Only when a corresponding bit in the third register indicates the permission, each of the detection circuits detects the start of processing of a corresponding assistance circuit by the occurrence of the access to the first register and detects the processing completion of a corresponding assistance circuit by the setting of a corresponding bit in the second register. When the processing is executed by the plurality of assistance circuits and there is no processing to be executed by the processor core, the interlock mechanism stops the pipeline processing when a detection circuit corresponding to a bit in the third register indicating the permission detects the start of processing of a corresponding assistance circuit, and restarts the pipeline processing when a detection circuit corresponding to a bit in the third register indicating the permission detects the processing completion of a corresponding assistance circuit. Accordingly, the validity/invalidity of the processing-completion waiting operation can be set for each assistance circuit. As a result, even when a microprocessor has a plurality of assistance circuits, the invention can be applied thereto.

It is preferable that a fourth register of the processor core has a plurality of bits which correspond to the plurality of assistance circuits and which are set during the processing of the respective assistance circuits. By referring to the fourth register, the status of the processing of the plurality of assistance circuits can be easily recognized.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENT

Figure 1:
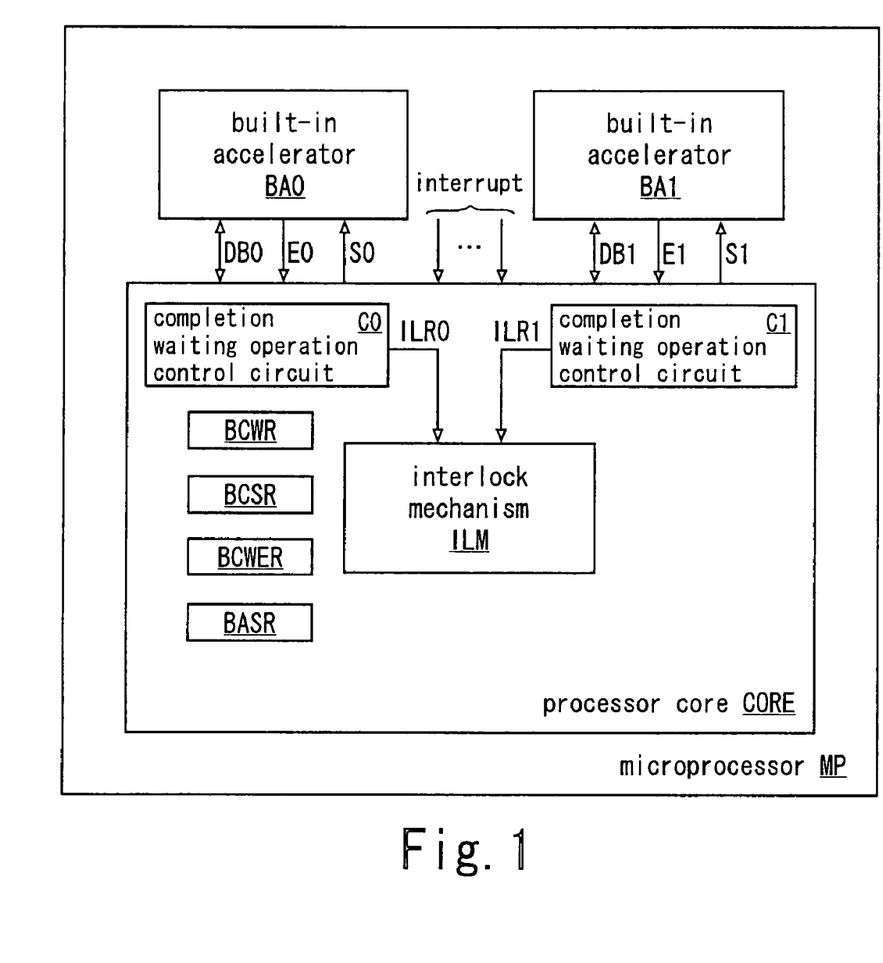
FIG. 1 is a block diagram showing a microprocessor according to an embodiment of the invention.
Figure 2:
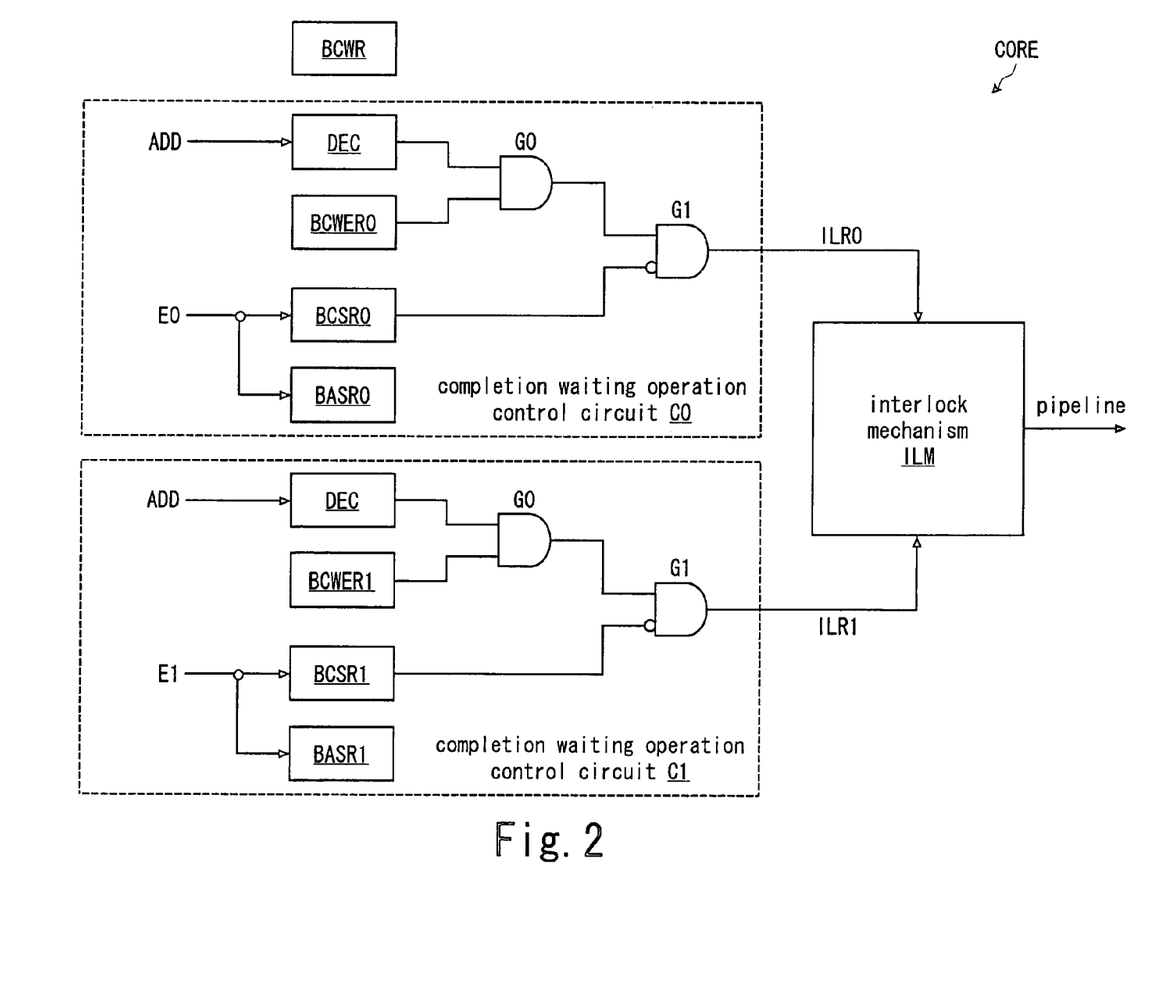
FIG. 2 is a block diagram showing essential parts of the processor core shown in FIG. 1.
Figure 3:
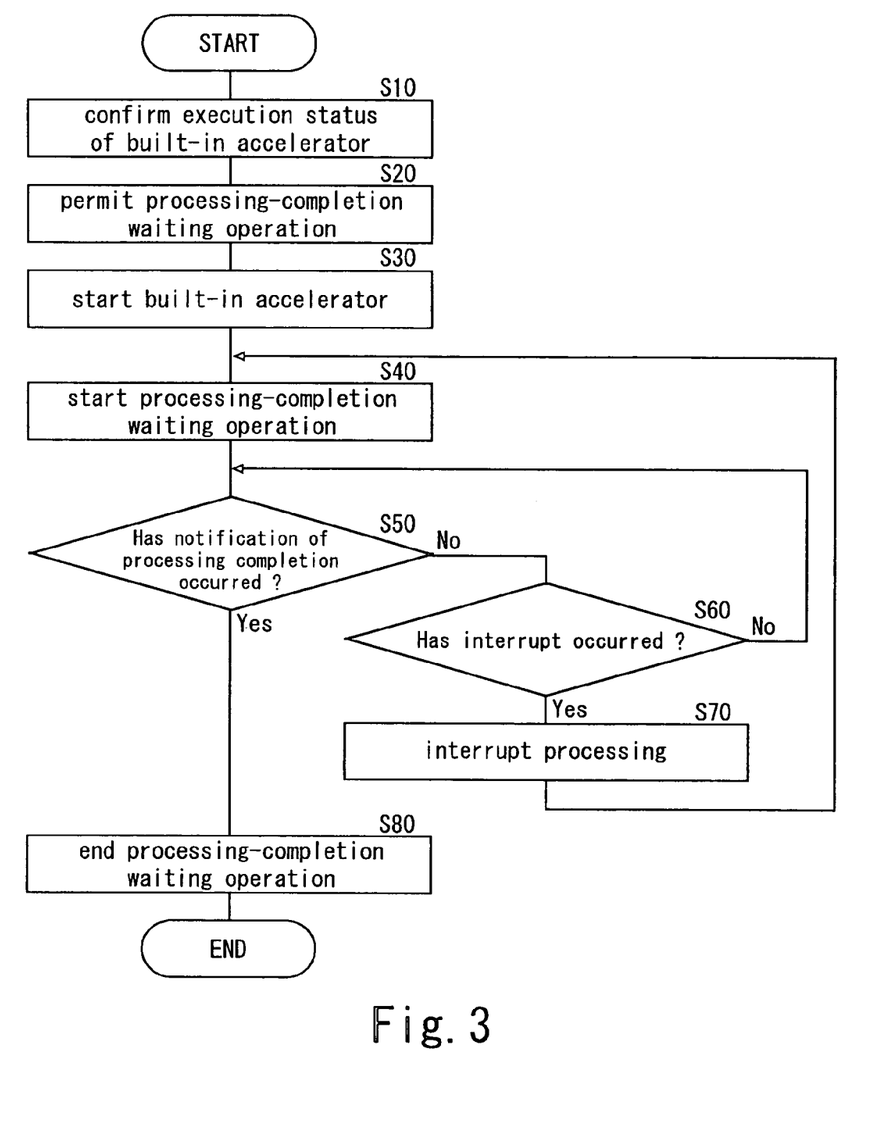
FIG. 3 is a flowchart showing an example of an operation of the processor core shown in FIG. 1.

Hereinafter, an embodiment of the invention will be described with reference to the drawings. FIGS. 1 to 3 show a microprocessor according to an embodiment of the invention. FIG. 1 shows an outline of the microprocessor of the invention. The microprocessor MP has a pipeline processing-type processor core CORE and built-in accelerators BA0 and BA1 (assistance circuits) that execute a specific processing, in place of the processor core CORE. Moreover, though not shown, the microprocessor MP has, for example, a memory circuit, such as a ROM, a RAM, or the like, and a peripheral circuit that implements a timer function, a communication interface function, or the like.

The processor core CORE has an interlock mechanism ILM, completion waiting operation control circuits C0 and C1 (detection circuits) that correspond to the built-in accelerators BA0 and BA1, respectively, a completion waiting operation execution register BCWR (first register), a completion status register BCSR (second register), a completion waiting operation enable register BCWER (third register), and an execution status register BASR (fourth register). The processor core CORE executes a pipeline processing according to a program stored in the ROM. The processor core CORE causes the built-in accelerator BA0 (BA1) to execute a processing which can be executed by the built-in accelerator BA0 (BA1). At this time, the processor core CORE outputs a request to start processing S0 (S1) to the built-in accelerator BA0 (BA1) and outputs processing input data to the built-in accelerator BA0 (BA1) via a data bus DB0 (DB1).

The completion waiting operation control circuit C0 activates an interlock request signal ILR0 to the interlock mechanism ILM according to the processing status of the built-in accelerator BA0 and the generation status of interrupts to the processor core CORE. Similarly, the completion waiting operation control circuit C1 activates an interlock request signal ILR1 to the interlock mechanism ILM according to the processing status of the built-in accelerator BA1 and the generation status of the interrupts to the processor core CORE. The details of the completion waiting operation control circuits C0 and C1 will be described below with reference to FIG. 2.

The interlock mechanism ILM examines a dependency relationship of processing data during the pipeline processing of the processor core CORE and, if necessary, stops the pipeline processing in order to ensure the justness of the processing result. Further, the interlock mechanism ILM starts an interlock operation in response to the activation of the interlock request signal ILR0 from the completion waiting operation control circuit C0 (stops the pipeline processing), when there is no processing to be executed by the processor core CORE till the processing completion of the built-in accelerator BA0. The interlock mechanism ILM ends the interlock operation in response to the inactivation of the interlock request signal ILR0 (restarts the pipeline processing).

Similarly, the interlock mechanism ILM starts the interlock operation in response to the activation of the interlock request signal ILR1 from the completion waiting operation control circuit C1, when there is no processing to be executed by the processor core CORE till the processing completion of the built-in accelerator BA1. The interlock mechanism ILM ends the interlock operation in response to the inactivation of the interlock request signal ILR1. Further, when an interrupt is generated from the peripheral circuit or the like during the interlock operation, the interlock mechanism ILM ends the interlock operation in order to execute an interrupt processing by the processor core CORE.

During the interlock operation of the interlock mechanism ILM, the processor core CORE changes from a normal mode to a low power consumption mode (for example, a mode where a clock in the processor core CORE is stopped). Further, when the interrupt is generated from the peripheral circuit or the like during the low power consumption mode, the processor core CORE returns from the low power consumption mode to the normal mode, executes the interrupt processing corresponding to the generated interrupt, and then changes to the low power consumption mode, as described below.

The built-in accelerator BA0 executes the specific processing in response to the request to start processing S0 from the processor core CORE by using processing input data outputted from the processor core CORE via the data bus DB0. When the processing is completed, the built-in accelerator BA0 outputs a notification of processing completion E0 and outputs processing result data to the processor core CORE via the data bus DB0. Similarly, the built-in accelerator BA1 executes the specific processing in response to the request to start processing S1 from the processor core CORE by using processing input data outputted from the processor core CORE via the data bus DB1. When the processing is completed, the built-in accelerator BA1 outputs a notification of processing completion E1 and outputs processing result data to the processor core CORE via the data bus DB1.

The completion waiting operation execution register BCWR is accessed by the processor core CORE as the built-in accelerators BA0 and BA1 start the processing. The completion status register BCSR has bits BCSR0 and BCSR1 corresponding to the built-in accelerators BA0 and BA1, respectively. The bit BCSR0 (BCSR1) is set to "1" in response to the notification of processing completion E0 (E1) from the built-in accelerator BA0 (BA1). The bit BCSR0 (BCSR1) of the completion status register BCSR is reset to "0" when the processor core CORE writes data "0".

The completion waiting operation enable register BCWER has bits BCWER0 and BCWER1 corresponding to the completion waiting operation control circuits C0 and C1 (that is, the built-in accelerators BA0 and BA1), respectively. The bit BCWER0 (BCWER1) indicates permission/prohibition of the operation of the completion waiting operation control circuit C0 (C1) (the processing-completion waiting operation to the built-in accelerator BA0 (BA1)). The execution status register BASR has bits BASR0 and BASR1 corresponding to the built-in accelerators BA0 and BA1, respectively. The bit BASR0 (BASR1) is set to "1" in response to the request to start processing S0 (S1) from the processor core CORE to the built-in accelerator BA0 (BA1) and is reset to "0" in response to the notification of processing completion E0 (E1) from the built-in accelerator BA0 (BA1) to the processor core CORE. Thus, the processor core CORE reads the execution status register BASR to recognize whether or not the built-in accelerators BA0 and BA1 are executing the processing.

FIG. 2 shows essential parts of the processor core CORE shown in FIG. 1. The completion waiting operation control circuit C0 has a decoder DEC and gate circuits G0 and G1. The decoder DEC activates an output signal to "1" when an address ADD of an access destination indicates the completion waiting operation execution register BCWR. Thus, the output signal of the decoder DEC is activated to "1" when an access to the completion waiting operation execution register BCWR occurs (that is, when at least one of the built-in accelerators BA0 and BA1 starts the processing).

The gate circuit G0 activates an output signal to "1" when the output signal of the decoder DEC and the bit BCWER0 of the completion waiting operation enable register BCWER are "1". That is, the output signal of the gate circuit G0 is activated to "1" when the access to the completion waiting operation execution register BCWR occurs in a state in which a processing-completion waiting operation to the built-in accelerator BA0 is permitted.

The gate circuit G1 activates the interlock request signal ILR0 to "1" when the output signal of the gate circuit G0 is "1" and the bit BCSR0 of the completion status register BCSR is "0". That is, the output signal of the gate circuit G1 is activated to "1" when the access to the completion waiting operation execution register BCWR occurs in a state in which the processing-completion waiting operation to the built-in accelerator BA0 is permitted and the processing by the built-in accelerator BA0 is not completed. Moreover, the configuration and the operation of the completion waiting operation control circuit C1 are the same as those of the completion waiting operation control circuit C0, except that the bits BCWER1 and BCSR1 corresponding to the built-in accelerator BA1 are referred to, and thus the descriptions thereof will be omitted.

The interlock mechanism ILM starts the interlock operation in response to the activation (the change from "0" to "1") of the interlock request signal ILR0 (ILR1), when there is no processing to be executed by the processor core CORE until the processing by the built-in accelerator BA0 (BA1) is completed, and ends the interlock operation in response to the inactivation (the change from "1" to "0") of the interlock request signal ILR0 (ILR1).

FIG. 3 shows an example of the operation of the processor core CORE shown in FIG. 1. For example, when a specific processing is executed by only the built-in accelerator BA0, the processor core CORE operates as follows. Here, a case in which there is no processing to be executed by the processor core CORE until the processing by the built-in accelerator BA0 is completed will be described. Moreover, the bits BCSR0 and BCSR1 of the completion status register BCSR are reset to "0" in advance.

(Step S10) The processor core CORE reads the execution status register BASR to confirm that the built-in accelerator BA0 is not executing the processing. Then, the operation of the processor core CORE is progressed to a step S20.

(Step S20) The processor core CORE writes data "1" into the bit BCWER0 of the completion waiting operation enable register BCWER in order to permit the processing completion waiting operation to the built-in accelerator BA0. Then, the operation of the processor core CORE is progressed to a step S30.

(Step S30) The processor core CORE outputs the request to start processing S0 to the built-in accelerator BA0 so as to causes the built-in accelerator BA0 to start the processing. Then, the operation of the processor core CORE is progressed to a step S40.

(Step S40) The processor core CORE accesses the execution register BCWR. Accordingly, the output signal of the decoder DEC and the bit BCWER1 of the completion waiting operation enable register BCWER become "1", and thus the output signal of the gate circuit G0 is also activated to "1". At this time, since the bit BCSR0 of the completion status register BCSR is "0", the interlock request signal ILR0 (the output signal of the gate circuit G1) is also activated to "1". Since there is no processing to be executed by the processor core CORE until the processing by the built-in accelerator BA0 is completed, the interlock mechanism ILM starts the interlock operation in response to the activation of the interlock request signal ILR0. That is, the processor core CORE starts the processing-completion waiting operation to the built-in accelerator BA0. Accordingly, the processor core CORE shifts from the normal mode to the low power consumption mode. Then, the operation of the processor core CORE is progressed to a step S50.

(Steps S50 and S60) The processor core CORE waits in the low power consumption mode until the notification of processing completion E0 from the built-in accelerator BA0 or the interrupt from the peripheral circuit or the like occurs. If the notification of the processing completion E0 from the built-in accelerator BA0 occurs, the operation of the processor core CORE is progressed to a step S80. On the other hand, if the interrupt occurs, the operation of the processor core CORE is progressed to a step S70.

(Step S70) If the interrupt occurs, the processor core CORE returns from the low power consumption mode to the normal mode. At this time, the interlock mechanism ILM ends the interlock operation in response to the occurrence of the interrupt. Then, the processor core CORE executes the interrupt processing corresponding to the occurred interrupt. Then, the operation of the processor core CORE is progressed to the step S40. Accordingly, the interlock mechanism ILM restarts the interlock operation and the processor core CORE shifts back to the low power consumption mode.

(Step S80) If the notification of processing completion E0 from the built-in accelerator BA0 occurs, the bit BCSR0 of the completion status register BCSR is set to "1". Thus, the interlock request signal ILR0 is inactivated to "0". For this reason, the interlock mechanism ILM ends the interlock operation in response to the inactivation of the interlock request signal ILR0. That is, the processor core CORE ends the processing-completion waiting operation to the built-in accelerator BA0. Accordingly, the processor core CORE returns from the low power consumption mode to the normal mode and executes a subsequent processing.

In the microprocessor MP having such a configuration, dynamic polling or waiting for the occurrence of the interrupt indicating the processing completion for recognizing the execution status of the processing by the built-in accelerator BA0 or BA1 is not required. Thus, the operation percentage of the processor core CORE can be reduced during the processing by the built-in accelerator BA0 or BA1, thereby reducing useless power consumption.

Figure 4:
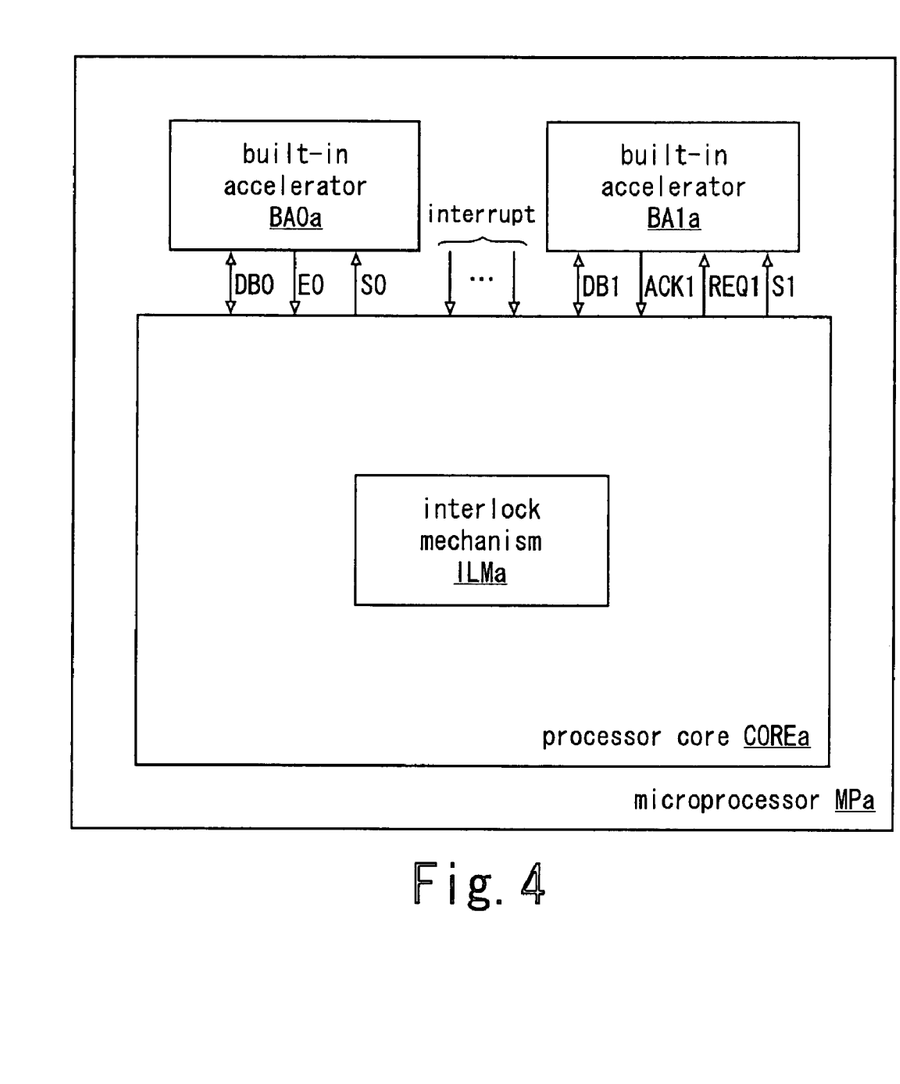
FIG. 4 is a block diagram showing a comparative example of the invention.

FIG. 4 shows a comparative example of the invention. A microprocessor MPa has a pipeline processing-type processor core COREa and built-in accelerators BA0a and BA1a that execute a specific processing, in place of the processor core COREa. The processor core COREa has an interlock mechanism ILMa that ensures the justness of the processing result of the pipeline processing. The processor core COREa causes the built-in accelerator BA0a (BA1a) to execute a processing that is executable by the built-in accelerator BA0a (BA1a). At this time, the processor core COREa outputs a request to start processing S0 (S1) to the built-in accelerator BA0a (BA1a) and outputs processing input data to the built-in accelerator BA0a (BA1a) via a data bus DB0 (DB1).

The built-in accelerator BA0a executes the specific processing with processing input data outputted from the processor core COREa via the data bus DB0 in response to the request to start processing S0 from the processor core COREa. When the processing is completed, the built-in accelerator BA0a outputs a notification of processing completion E0 and outputs data of the processing result to the processor core COREa via the data bus DB0. The processor core COREa receives the notification of processing completion E0 from the built-in accelerator BA0a as an interrupt and recognizes the processing completion of the built-in accelerator BA0a through the occurrence of the interrupt.

The built-in accelerator BA1a executes the specific processing with processing input data outputted from the processor core COREa via the data bus DB1 in response to a request to start processing S1 from the processor core COREa. Only when the processing is completed, the built-in accelerator BA1a outputs a notification of processing completion ACK1 in response to a request to notify REQ1 from the processor core COREa and outputs data of the processing result to the processor core COREa via the data bus DB1.

In the microprocessor MPa having such a configuration, the processor core COREa needs to wait for the interrupt corresponding to the notification of processing completion E0 so as to confirm the execution status of the processing by the built-in accelerator BA0a. Further, the processor core COREa needs to regularly perform polling so as to confirm the execution status of the processing by the built-in accelerator BA1a. For this reason, even when there is no processing to be executed till the processing completion of the built-in accelerators BA0a and BA1a, the processor core CORE needs to be constantly operating. As a result, during the processing of the built-in accelerators BA0a and BA1a, power consumption of the processor core COREa (the microprocessor MPa) is uselessly increased.

As described above, in the present embodiment, the processor core CORE does not need to be controlled to perform dynamic polling or wait for the occurrence of the interrupt indicating the processing completion in order to recognize the execution status of the processing of the built-in accelerator BA0 or BA1. Thus, during the processing of the built-in accelerator BA0 or BA1, useless power consumption can be reduced. Further, the interlock mechanism is typically mounted on the pipeline processing-type microprocessor and thus the processing-completion waiting operation mechanism can be implemented by using the interlock mechanism. Accordingly, the processing-completion waiting operation mechanism can be easily implemented, without drastically changing the circuit design of an existing microprocessor.

Since the processing-completion waiting operation mechanism of the built-in accelerator BA0 or BA1 is implemented by using the interlock mechanism, the shift from the normal mode to the low power consumption mode can be performed at a high speed (one fetch cycle). Further, since the processing-completion waiting operation mechanism of the built-in accelerator BA0 or BA1 is implemented by using the interlock mechanism, the processor core CORE can receive the interrupt occurred during the low power consumption mode, such that a new operation verification regarding the interrupt is not required. In addition, the bits of each of the completion status register BCSR, the completion waiting operation enable register BCWER, and the execution status register BASR are provided to correspond to the two built-in accelerators BA0 and BA1, and thus validity/invalidity of the processing-completion waiting operation to one or both of the built-in accelerators BA0 and BA1 can be simultaneously changed. Therefore, even when two built-in accelerators BA0 and BA1 are provided in a microprocessor, the invention can be easily applied to such a microprocessor.

Moreover, in the above-described embodiment, an example in which the invention is applied to the microprocessor having two built-in accelerators is described. However, the present invention is not limited to the embodiment. For example, the invention may be applied to a microprocessor having one built-in accelerator or a microprocessor having three built-in accelerators or more.

The invention is not limited to the above embodiments and various modifications may be made without departing from the spirit and scope of the invention. Any improvement may be made in part or all of the components.

What is claimed is:

1. A microprocessor comprising:
   a processor core performing pipeline processing method and having an interlock mechanism stopping and restarting the pipeline processing according to processing data so as to ensure justness of a result of the pipeline processing; and
   an assistance circuit that executes a specific processing in place of said processor core, wherein when the specific processing is executed by said assistance circuit and there is no pipeline processing to be executed by said processor core, said interlock mechanism stops and restarts the pipeline processing in response to a start and a completion, respectively, of the specific processing executed by said assistance circuit; wherein:
   said processor core has a normal mode and a low power consumption mode; and
   during the normal mode, when the specific processing is executed by said assistance circuit and there is no pipeline processing to be executed by said processor core, said processor core shifts to the low power consumption mode in response to the stop of the pipeline processing by said interlock mechanism through a completion waiting operation to said assistance circuit; and
   during the stop of the pipeline processing, said interlock mechanism restarts the pipeline processing in response to occurrence of an interrupt and stops the pipeline processing, again, after an interrupt processing by said processor core is completed.

2. The microprocessor according to claim 1, wherein:
during the low power consumption mode, said processor core returns to the normal mode in response to the restart of the pipeline processing by said interlock mechanism through the completion waiting operation to said assistance circuit.

3. The microprocessor according to claim 1, wherein:
said processor core has a detection circuit that detects the start and the completion of the specific processing executed by said assistance circuit; and
when there is no pipeline processing to be executed by said processor core during the specific processing executed by said assistance circuit, said interlock mechanism stops and restarts the pipeline processing in response to detection of the start, and of the completion, respectively, of the specific processing executed by said assistance circuit.

4. The microprocessor according to claim 3, wherein:
said processor core has a first register which is accessed in accordance with the start of execution of the specific processing of said assistance circuit; and
said detection circuit detects the start of the execution of the specific processing by said assistance circuit by the access to said first register.

5. The microprocessor according to claim 3, wherein:
said processor core has a second register which is set in response to the completion of the specific processing of said assistance circuit; and
said detection circuit detects the completion of execution of the specific processing by said assistance circuit by the setting of said second register 6. The microprocessor according to claim 3, wherein:
said processor core has a third register which indicates permission/inhibition of a detection operation of said detection circuit; and
said detection circuit executes the detection operation only when said third register indicates the permission.

7. The microprocessor according to claim 3, wherein:
said processor core has a fourth register which is set during the specific processing by said assistance circuit.

8. The microprocessor according to claim 1, further comprising:
a plurality of said assistance circuits;
said processor core comprises:
a plurality of detection circuits respectively corresponding to the plurality of assistance circuits and detecting start and completion of respective specific processings executed by the plurality of assistance circuits,
a first register accessed in accordance with the start of execution of the specific processings by the plurality of assistance circuits,
a second register having a plurality of completion bits respectively corresponding to the plurality of assistance circuits and set in response to the completion of the execution of the respective specific processings by the plurality of assistance circuits, and a third register having a plurality of bits respectively corresponding to the plurality detection circuits and indicating permission/inhibition of detection operations of the plurality of detection circuits, wherein:

only when a corresponding bit in said third register indicates the permission, each of said detection circuits detects the start of the execution of the specific processing by a corresponding assistance circuit by occurrence of an access to said first register and detects the completion of the specific processing by a corresponding assistance circuit by a setting of a corresponding completion bit in said second register; and when the specific processing is executed by the plurality of assistance circuits and there is no pipeline processing to be executed by said processor core, said interlock mechanism stops the pipeline processing when a detection circuit, corresponding to a bit in said third register indicating the permission, detects the start of the execution of the specific processing by a corresponding assistance circuit, and restarts the pipeline processing when the detection circuit corresponding to the bit in said third register indicating the permission detects the completion of the execution of the specific processing by the corresponding assistance circuit.

9. The microprocessor according to claim 8, wherein:

said processor core includes a fourth register which has a plurality of execution bits respectively corresponding to the plurality of assistance circuits and being set during the execution of the specific processing by the respective assistance circuits.

* * * * *

UNITED STATES PATENT AND TRADEMARK OFFICE
CERTIFICATE OF CORRECTION

PATENT NO. : 7,480,812 B2
APPLICATION NO. : 11/165239
DATED : January 20, 2009
INVENTOR(S) : Ryosuke Kito et al.

Page 1 of 1

It is certified that error appears in the above-identified patent and that said Letters Patent is hereby corrected as shown below:

Column 10, Line 44, after "register" insert --.--.

Column 11, Line 4, after "plurality" insert --of--.

Signed and Sealed this

Thirty-first Day of March, 2009

JOHN DOLL
*Acting Director of the United States Patent and Trademark Office*